REFRACTORY ARTICLES
Filed Feb. 3, 1961
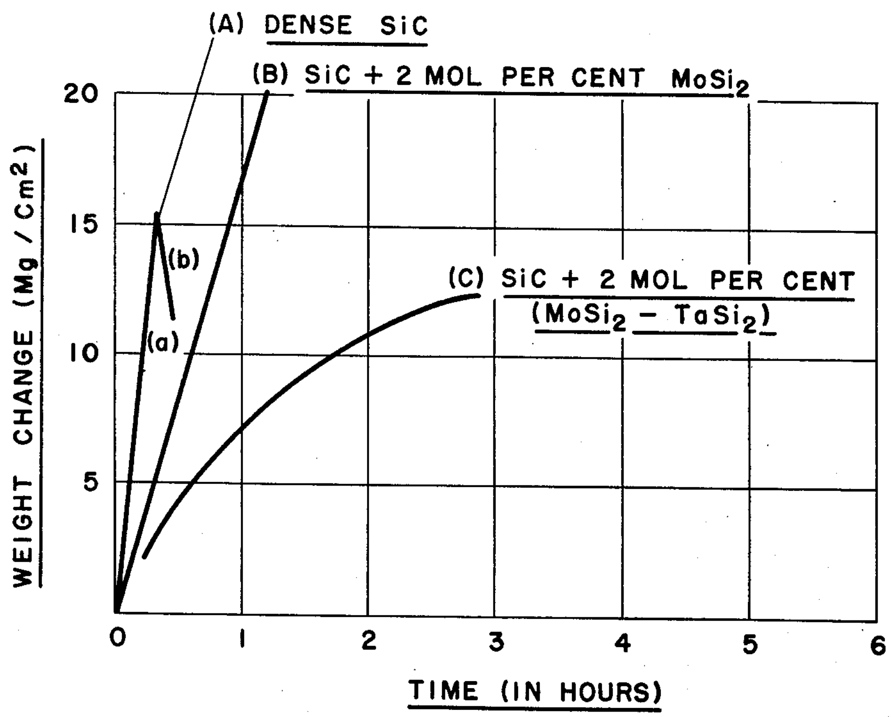
(a) = INCREASE IN WEIGHT BY $O_2$ PICK-UP
(b) = WEIGHT LOSS BY REACTION OF SiC + $SiO_2$
TYPICAL WEIGHT CHANGE DATA FOR INDICATED MATERIAL AT 1850°C (3860°F)
INVENTOR.
KENNETH M. TAYLOR
BY
K. W. Brownell
ATTORNEY United States Patent Office 3,189,472

Patented June 15, 1965

3,189,472

REFRACTORY ARTICLES

Kenneth M. Taylor, Lewiston, N.Y., assignor to The Carborundum Company, Niagara Falls, N.Y., a corporation of Delaware Filed Feb. 3, 1961, Ser. No. 87,032
3 Claims. (Cl. 106—55)

This invention relates to refractory articles having improved oxidation resistance at elevated temperatures and more particularly to improve bodies of dense silicon carbide.

Rapidly advancing technological developments in science and industry call for the utilization of materials capable of withstanding increasingly high temperatures and concomitantly severe oxidation conditions. In the exploration of outer space, the need for materials capable of withstanding high temperature oxidizing conditions is clearly evidenced. Components of rockets and missiles must withstand high temperature oxidizing conditions caused by rapid movement of such bodies through the lower atmosphere and also, components of their propulsion units must withstand the high temperature oxidizing conditions produced by the high energy fuels utilized therein.

In industry, increasingly high temperatures with concomitant oxidizing conditions are being employed, as for example to fabricate high temperature components for space vehicles. Accordingly, furnace heating elements, liners etc., capable of withstanding these rigid conditions are needed. Silicon carbide has been used heretofore in electrical resistance heating elements and for other refractory applications. However, this material suffers the disadvantage of having a low oxidation resistance above temperatures of about 1500° C. and accordingly merits improvement. If suitably improved, silicon carbide could find wide use in many high temperature applications wherein oxidizing conditions are encountered.

It is accordingly an important object of the present invention to provide refractory bodies of improved resistance to oxidation at high temperatures.

Another important object is to provide dense silicon carbide bodies of improved oxidation resistance at elevated temperatures by the addition thereto of selected metal additives.

These and other objects of the invention will become more apparent from the following specification taken in conjunction with the sole figure of the drawing which is a graph containing an oxidation curve of a dense silicon carbide body in comparison with oxidation curves of dense silicon carbide bodies containing various additives of the invention.

In accordance with the present invention, dense silicon carbide bodies are provided with improved resistance to oxidation at elevated temperatures by the incorporation therein of metals selected from the group of tungsten, chromium, iron, hafnium, tantalum, titanium, zirconium and molybdenum. The foregoing additives can be utilized either singly or in admixture. In the practice of the invention, it is the presence of the metal itself rather than the specific compound by which it is added that is important and imparts the oxidation resistance. Accordingly the elemental metals may be utilized as additives. Also, compounds of the metals may be used and examples of compounds which may be employed include the oxides, carbides, silicides, hydrides and nitrides. However, it is to be considered within the scope of the invention to utilize other suitable chemical compounds for the addition of the metals.

The additives may be utilized to provide a metal content in the dense silicon carbide body in the broad range of from about 1% by weight to about 30% by weight. Preferably the additive will be employed to provide from about 2% by weight to about 10% by weight of metal in the dense silicon carbide body.

As applied to the present invention a dense silicon carbide body is defined as a silicon carbide body having a bulk density of at least about 3.0. Thus bodies of very high density are contemplated in view of the fact that the theoretical density of silicon carbide is about 3.2. By the present invention, dense silicon carbide bodies are provided which are resistant to oxidation at temperatures as high as 1850° C., and notable improvement in oxidation resistance is provided in the temperature range from about 1500° C. to about 1850° C. Thus a substantial improvement in performance over the 1500° C. level formerly encountered is provided by the present invention.

The following examples illustrate the production of specific bodies thereby highlighting the invention.

*Example I*

A mix was made having the following composition in parts by weight:

| | Parts |
|---|---|
| Silicon carbide, 14–36 mesh | 48 |
| Silicon carbide, minus 80 mesh | 42 |
| Silicon carbide, minue 400 mesh | 10 |
| Tungsten oxide, minus 200 mesh | 4 |
| Chromium oxide, minus 200 mesh | 1 |
| Iron silicide, minus 200 mesh | 2 |
| Powdered phenolic resin | 2 |
| Pine oil | 5 |

The mix was pressed into a body at about 5,000 p.s.i. and oven dried at about 225° F. to vaporize the pine oil and harden the resin. Then the body was heated to approximately 2300° C. in an inert atmosphere to recrystallize the silicon carbide and form a bonded somewhat porous body which was impregnated with carbon by saturating with furfural followed by carbonizing the furfural with acid. Thereafter the body was siliconized at about 2100° to 2300° C., converting the carbon to silicon carbide and forming a dense silicon carbide article containing metal additives. Spectroscopic analysis showed that appreciable amounts of tungsten, chromium and iron additives were present in the final article.

*Example II*

A mixture of silicon carbide grain ranging in particle size from 100 to 1,000 mesh and a small amount of temporary binder, such as polyvinyl alcohol, was compressed and then heated in an induction furnace to about 2200° C. to recrystallize the silicon carbide and permanently bond the body. The body was then impregnated with a liquid phenolic resin and heated to cure the resin.

The cured body was then placed in a furnace along with metallic silicon and metallic zirconium (approximately 50:50 mole percent). Thereafter, with an inert atmosphere, the temperature of the furnace was raised slowly from room temperature to 2100° C'–2200° C. The heating was effective first to carbonize the resin at lower temperatures; and at the higher temperatures was effective to cause silicon carbide, zirconium silicide and zirconium carbide formations. A dense body of silicon carbide containing zirconium additives was thereby produced.

X-ray analysis showed the presence of silicon carbide, zirconium, zirconium silicide and zirconium carbide in the finished product.

*Example III*

This example illustrates the manner in which the oxidation resistance of a dense silicon carbide body can be substantially improved by the addition thereto of molybdenum disilicide.

A dense silicon carbide body containing molybdenum disilicide was made from the following ingredients:

| | |
|---|---|
| Silicon carbide, 100 mesh ____________grams__ | 48 |
| Silicon carbide, 220 mesh ____________do____ | 13 |
| Silicon carbide, 3F mesh _____________do____ | 12 |
| Silicon carbide, 1000 mesh ___________do____ | 8 |
| Carbon, Dixon 200–10 through 15X graphite grams__ | 8.5 |
| Molybdenum disilicide ______________do____ | 9.10 |
| Liquid phenolic resin _______________do____ | 8.4 |
| Furfural ______________________________cc__ | 3 |

The ingredients were thoroughly admixed and pellets were pressed therefrom at 4000 p.s.i., followed by drying at 100° C. for 12 hours. Thereafter the pellets were siliconized at 2250° C. for 30 minutes in an argon atmosphere to provide a density of 3.15 g./cm.$^3$. Dense silicon carbide bodies so formed were subjected to oxidation by suspending from an analytical balance into an oxidation furnace at the end of a sapphire rod for measuring weight change. The furnace was slowly brought up to temperature over an interval of about 50 minutes and held at 1850° C. to observe oxidation characteristics of the body. These oxidation characteristics are plotted on FIGURE 1 of the drawing as curve B, reflecting weight change versus time.

Comparison of curve B with curve A (a dense silicon carbide body without additive) shows that molybdenum disilicide imparts substantially improved oxidation resistance over the corresponding body without additive.

*Example IV*

This example illustrates the improvement in oxidation resistance imparted to dense silicon carbide by the addition thereto of molybdenum disilicide and tantalum disilicide.

A dense silicon carbide body containing molybdenum and tantalum silicides was made from the following ingredients:

| | |
|---|---|
| Silicon carbide 100 mesh ____________grams__ | 48 |
| Silicon carbide 220 mesh _____________do____ | 13 |
| Silicon carbide 3F mesh ______________do____ | 12 |
| Silicon carbide 1000 mesh ____________do____ | 8 |
| Carbon, Dixon 200–10 through 15X graphite ______________do____ | 8.5 |
| $MoSi_2$ (40 mole percent)-$TaSi_2$ (60 mole percent) grams__ | 12.2 |
| Liquid phenolic resin ________________do____ | 8.5 |
| Furfural _____________________________cc__ | 3.0 |

The ingredients were thoroughly admixed and pellets were pressed from the admixture at 4000 p.s.i. and dried at 120° F. for 12 hours to cure the resin. After curing, the pellets were placed in a furnace along with metallic silicon in 10% excess of the amount needed for reaction with the free carbon in the body and thereafter the temperature was raised slowly from room temperature to about 2250° C. and held there for 30 minutes. The heating was effective first to carbonize the resin at the lower temperatures and then melt the silicon at about 1500° C.; and at the higher temperatures was effective to cause carbide formation. By so operating a dense silicon carbide body was produced containing small amounts of molybdenum and tantalum compounds such as silicides.

For comparison to the above body, a dense silicon carbide body without additive was made by the same procedure.

Both of the above bodies were subjected to identical oxidizing conditions by suspending from an analytical balance arm into an Ajax oxidation furnace at the end of a sapphire rod for measuring weight change. The furnace was slowly brought up to an oxidation temperature of 1850° C. over a period of about 45 minutes and held at that temperature to observe oxidation characteristics. These are plotted in FIG. 1 of the drawing as curves A and C. The body containing the molybdenum and tantalum compounds displayed greatly increased resistance to oxidation at 1850° C., as compared to the silicon carbide body. It will be noted that the silicon carbide body increased in weight very rapidly within one-half hour. In contrast, the silicon carbide body with additive showed very little increase in weight at the end of 30 minutes; even at the end of three hours this body displayed substantially less oxidation, as evidenced by increase in weight, than did the silicon carbide body without additive at the end of 30 minutes.

This demonstrates that the addition of a combination of molybdenum and tantalum provides a preferred embodiment of the invention.

The foregoing examples show that the additive may be incorporated into the mixture utilized to form the molded body which is subsequently siliconized. Also, the examples show that the additive may be incorporated in the silicon carbide body during the siliconization step. Thus the scope of the invention includes the incorporation of the additive either before or with siliconization, the important point being that the additive is present in the ultimate body.

Bodies made in accordance with the present invention may be employed in many high temperature applications where oxidation resistance is an important factor. Among these applications are included components for space vehicles such as nose cones for guided missiles, rocket motor parts such as exhaust gas nozzles and the like. Also articles made in accordance with the invention can be utilized to great advantage in many high temperature industrial applications such as for electrical resistance heating rods, linings for furnaces, and the like.

While the present invention has been described in connection with specific embodiments thereof, it is subject to reasonable modifications as will become apparent to those skilled in the art and such modifications are to be included within the scope of the appended claims.

I claim:

1. A method for producing a dense body consisting principally of silicon carbide and having improved resistance to oxidation at temperatures in the range from about 1500° C. to about 1850° C., which comprises: forming a body consisting essentially of silicon carbide, carbon, and, as an additive for imparting said oxidation resistance, at least one member of the group consisting of tungsten, chromium, iron, hafnium, tantalum, titanium, zirconium, and molybdenum, and compounds thereof; and siliconizing said body at a temperature of at least about 2100° C. to convert said carbon to silicon carbide whereby to give a dense body having a density of at least 3.0 g./cm.$^3$, said additive being present before siliconizing in an amount equivalent to from about 2 wt. percent to about 10 wt. percent of metal in said dense body and being of such nature as to remain in said body at the temperature employed in siliconizing said body.

2. A method as set forth in claim 1 in which said additive is a mixture of molybdenum disilicide and tantalum disilicide.

3. A method as set forth in claim 1 in which said body, before siliconizing, is produced by heating a formed body consisting essentially of granular silicon carbide and said additive thereby to cause recrystallization of said silicon carbide, and impregnating the resultant porous body with carbon.

References Cited by the Examiner

UNITED STATES PATENTS

| | | | |
|---|---|---|---|
| 2,406,275 | 8/46 | Wejnarth | 106—66 |
| 2,908,553 | 10/59 | Frank et al. | 106—44 |
| 2,938,807 | 5/60 | Anderson | 106—44 |
| 3,035,325 | 5/62 | Nicholson et al. | 106—44 |
| 3,036,017 | 5/62 | Schrewelius | 106—44 |

TOBIAS E. LEVOW, *Primary Examiner.*

JOSEPH REBOLD, JOHN H. MACK, *Examiners.*